United States Patent
Furuichi

(10) Patent No.: US 6,363,072 B1
(45) Date of Patent: Mar. 26, 2002

(54) ATM NETWORK COMMUNICATION CONTROL SYSTEM ALLOWING END-TO-END CONNECTION TO BE SET UP WITH EASE AND COMMUNICATION CONTROL METHOD THEREOF

(75) Inventor: Hideyuki Furuichi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/133,405

(22) Filed: Aug. 13, 1998

(30) Foreign Application Priority Data

Aug. 15, 1997 (JP) .............................. 9-235344

(51) Int. Cl.[7] .............................................. H04L 12/28
(52) U.S. Cl. ...................................... 370/395; 370/400
(58) Field of Search ................................ 370/360, 386, 370/389, 391, 392, 395, 396, 397, 398, 399, 400, 401, 465

(56) References Cited

U.S. PATENT DOCUMENTS

| | | | | |
|---|---|---|---|---|
| 5,896,568 A | * | 4/1999 | Tseng et al. ................. | 455/422 |
| 6,243,357 B1 | * | 6/2001 | Sasagawa .................... | 370/216 |
| 6,252,878 B1 | * | 6/2001 | Locklear, Jr. et al. ....... | 370/401 |
| 6,253,230 B1 | * | 6/2001 | Couland et al. ............ | 709/203 |

FOREIGN PATENT DOCUMENTS

JP          Hei 5-37569          2/1993

OTHER PUBLICATIONS

English language translation of Japanese Office Action dated Mar. 9, 1999 (Hei.
"Multiprotocol Routing Scheme over ATM Networks", Kitazume et al., Communication Technology Report In93–106, pp. 1–6.

"A Study on Virtual LAN Service Archtecture over ATM based Connectionless Data Networks", Ushjima etal., Communication Technology Report SSE94–135, pp.45–50, Oct. 28, 1994.

"Protocol Archtecture for ATM–LAN" Iwata et al., Communication Technology Report IN92–109, pp. 7–12, Feb. 26, 1993.

Y. Katsube, et al., "Cell Switch Router—Basic Concept for Migration Scenario", The Institute of Electronics, Information and Communication Engineers, Technical Report of IEICE. SSE95–201, IN95–145 (1996–03).

S. Matsuzawa et al., "Cell Switch Router—Protocol Mechanism and Implementation Architecture", The Institute of Electronics, Information and Communication Engineers, Technical Report of IEICE. SSE95–202, IN95–146, (1996–03).

* cited by examiner

Primary Examiner—Wellington Chin
Assistant Examiner—Brenda H. Pham
(74) Attorney, Agent, or Firm—Whitham, Curtis & Christoffferosn, PC

(57) ABSTRACT

A communication control system comprises a route server and an ATM switch, and an edge switch for connecting an ATM network and other IP sub-network, the route server generates a table putting together relationships between an IP sub-network and an ATM address of a device to be passed through for reaching the IP sub-network by using information collected from every edge switch on the ATM network, and the edge switch notifies the route server of an ATM address of the device of its own and information regarding an IP sub-network, and searches for an ATM address of a destination of a packet with reference to a table sent from the route server and sets a necessary connection based on a search result.

11 Claims, 6 Drawing Sheets

ATM NETWORK COMMUNICATION CONTROL SYSTEM ALLOWING END-TO-END CONNECTION TO BE SET UP WITH EASE AND COMMUNICATION CONTROL METHOD THEREOF

BACKGROUND OF THE INVENTION

1. Field of the Invention

The present invention relates to a communication control system which conducts IP (Internet Protocol) packet distribution over an ATM (Asynchronous Transfer Mode) network and a communication control method thereof and, more particularly, to an ATM network communication control system attaining high-speed transmission through reduction of such packet transmission by hop-by-hop such as that by a router within a network, and a communication control method thereof.

2. Description of the Related Art

Among conventional art of this kind for conducting IP (Internet Protocol) packet distribution over an ATM network, the following four are well known.

Classical IP model and Tag Switching

MPOA

IP Switch

Cell Switch Router

Characteristics of the respective art will be described in the following.

a) Characteristics of Classical IP model and Tag Switching

FIG. 5 is a schematic diagram showing structure of an ATM network to which the classical IP model and a tag switching are applied. For communication between different IP sub-nets according to this art, a router is indispensable between the IP sub-nets as shown in FIG. 5.

Classical IP model and tag switching, however, have a drawback that no improvement can be expected of a transmission rate in communication between different IP subnets. The reason is that a router always intervening between IP sub-nets to conduct packet transmission by software processing bottlenecks packet transmission.

b) Characteristics of MPOA

FIG. 6 is a schematic diagram showing structure of an ATM network to which MPOA is applied. As illustrated in FIG. 6, an MPC (Multiprotocol Client) and an MPS (Multiprotocol Server) are provided in the network. This system employs LANE (LAN Emulation, LAN represents Local Area Network) and NHRP (Next Hop Resolution Protocol) techniques. Within the same IP subnet, an LANE protocol is used for communication. For communication between different IP sub-nets, an MPC first serves as a router and then a direct connection is set up between MPSs of a transmission source and a transmission destination to carry out communication.

In FIG. 6, for communication from an MPS1 to an MPS2, an MPC sets up a shortcut VC (Virtual Channel) to each of the MPS1 and the MPS2. At this state, the MPC serves as a router to carry out communication. If at this occasion, communication to the same destination is conducted frequently, an NHRP protocol operates, so that the MPC1 sets up a shortcut VC to the MPS2. At this state, direct communication is possible between the MPS1 and the MPS2 to enable high-speed transfer of packets.

MPOA, however, has a drawback that efficiency is not high because an end-to-end connection can be set up only after connections are established between adjacent MPC and MPS and between adjacent MPSs. The reason is that an end-to-end connection is enabled after the MPS sends or receives a protocol to/from its adjacent node.

Another drawback is that when a new packet is generated, load on an MPS in processing will be sharply increased. The reason is that when a new packet is generated, each node conducts address resolution and creation of a table by sending or receiving a protocol to/from its adjacent node.

A further drawback is that as a network is increased in scale, address resolution resources of the entire network are exponentially increased. The reason is that as the network is increased in scale, the number of entries in an address resolution table which the MPS has as well as the number of MPSs increases.

c) Characteristics of IP Switch

FIG. 7 is a schematic diagram showing structure of an ATM network to which an IP switch is applied. As illustrated in FIG. 7, an IP switch gateway (hereinafter abbreviated as GW) and an IP switch (hereinafter abbreviated as IPSW) are provided in the network. A GW mainly conducts termination of an IP switch network. An IPSW is mainly composed of a controller unit (hereinafter abbreviated as CTL) for forwarding an IP packet and a switch unit (hereinafter abbreviated as SW) for switching an ATM cell. A GW is connected to only one IPSW and belongs to a plurality of existing LANs. An IPSW is connected to a plurality of GWs and IPSWs. An IP sub-net provided between a certain IPSW and another IPSW has only these two nodes. Each port of the GW and the IPSW has an IP address.

As illustrated in FIG. 7, VCs are always being set up between adjacent devices. On this occasion, a CTL serves as a router to carry out communication by hop-by-hop. If communication to the same destination is conducted frequently, each node used in the communication sends an upstream node a request for preparing a dedicated VC. When there is no abnormality in particular, a dedicated VC will be set up between adjacent nodes. A specific protocol also causes a dedicated VC to be set up between adjacent nodes. When dedicated VCs are established both upstream and downstream the IPSW, the IPSW directly connects the VCs by an SW. In other words, the CTL is prevented from intervening in a communication path. Since at this state, no routing is conducted within the IPSW, packets can be transferred at a high speed.

Using an IP switch, however, has a drawback that efficiency is not high because an end-to-end connection can be set up only after dedicated VCs are established between adjacent GW and IPSW and between adjacent IPSWs. The reason is that an end-to-end connection is enabled after the IPSW sends or receives a protocol to/from its adjacent node.

Another drawback is a total lack of affinity with an approach of an ATM forum. The reason is that a unique protocol is adopted.

A further drawback is that an IP domain is wastefully consumed. The reason is that a port of an IPSW requires an IP address for terminating an IP protocol.

Still further drawback is that a routing protocol should be mounted on every ATM switch. In other words, an ATM network should be composed of IPSWs. The reason is that no communication is possible unless the IPSW conducts routing processing.

Still further drawback is that when a new packet is generated, load on an IPSW in processing will be sharply increased. The reason is that when a new packet is generated, each node conducts address resolution and creation of a table by sending or receiving a protocol to/from its adjacent node.

Still further drawback is that as a network is increased in scale, address resolution resources of the entire network are exponentially increased. The reason is that increase in scale of a network is followed by an increase in the number of entries in an address resolution table which the IPSW has as well as the number of the IPSWs.

d) Characteristics of Cell Switch Router

A cell switch router (hereinafter abbreviated as CSR) is provided in a network. A CSR is mainly composed of a CTL for forwarding an IP packet and an SW for switching an ATM cell. The CSR also conducts termination of a CSR network.

Basic operation of the cell switch router is similar to that of an IP switch. With a VC set up in advance between adjacent devices, the CTL carries out communication by hop-by-hop as a router does. For a specific packet, a dedicated VC is prepared between adjacent nodes which are to be connected by an SW. In other words, the CTL is prevented from intervening in a communication path. Since at this state, no routing is conducted within the CSR, packets can be transferred at a high speed. Protocol used is different from that used for an IP switch.

Conventional IP packet distribution techniques using the above-described cell switch router are recited, for example, in the literature "Cell Switch Router—Basic Concept and Migration Scenario" (Yasuhiro Katsube, Ken-ichi Nagami, Shigeo Matsuzawa, THE INSTITUTE OF ELECTRONICS, INFORMATION AND COMMUNICATION ENGINEERS, TECHNICAL REPORT OF IEICE. SSE95-201, IN95-145 (1996-03)) and the literature "Cell Switch Router—Protocol Mechanism and Implementation Architecture" (Shigeo Matsuzawa, Ken-ichi Nagami, Akiyoshi Mogi, Tatsuya Jinmei, Yasuhiro Katsube, THE INSTITUTE OF ELECTRONICS, INFORMATION AND COMMUNICATION ENGINEERS, TECHNICAL REPORT OF IEICE, SSE95-202, IN95-146 (1996-03)).

Using a cell switch router, however, has a drawback that efficiency is not high because an end-to-end connection can be set up only after a dedicated VC is established between adjacent CSRs. The reason is that an end-to-end connection is enabled after the CSR sends or receives a protocol to/from its adjacent node.

Another drawback is a total lack of affinity with an approach of an ATM forum. The reason is that a unique protocol is adopted.

A further drawback is that an IP domain is wastefully consumed. The reason is that each port of a CSR requires an IP address for terminating an IP protocol.

Still further drawback is that a routing protocol should be mounted on every ATM switch. In other words, an ATM network should be composed of CSRS. The reason is that no communication is possible unless the CSR conducts routing processing.

Still further drawback is that when a new packet is generated, load on a CSR in processing will be sharply increased. The reason is that when a new packet is generated, each node conducts address resolution and creation of a table by sending or receiving a protocol to/from its adjacent node.

Still further drawback is that as a network is increased in scale, address resolution resources of the entire network are exponentially increased. The reason is that increase in scale of a network is followed by an increase in the number of entries in an address resolution table which the CSR has as well as the number of the CSRs.

SUMMARY OF THE INVENTION

An object of the present invention is to provide an ATM network communication control system capable of communicating without a router between different IP sub-nets and realizing speed-up of packet transmission and improvement in transmission efficiency and a communication control method thereof.

Another object of the present invention is to provide an ATM network communication control system which realizes speed-up of packet transmission and improvement in transmission efficiency by setting up an end-to-end connection with ease and at a high speed, and a communication control method thereof.

A further object of the present invention is to provide an ATM network communication control system which realizes improvement of transmission efficiency, saving of address resolution resources and effective use of an IP sub-net through simplification of structure of an ATM network, and a communication control method thereof.

Still further object of the present invention is to provide an ATM network communication control system having affinity with existing equipment improved by realizing acquisition of address information, notification of address information, setting of connections and other processing by an ATM-forum-based protocol, and a communication control method thereof.

According to the first aspect of the invention, a communication control system including a route server and an ATM switch provided on an ATM network, and edge switches for connecting the ATM network and other IP sub-networks to control a connection between an arbitrary one of the edge switches and the ATM switch, wherein the route server comprises
information accumulation means for collecting and accumulating, from every the edge switches on the ATM network, an ATM address of the edge switch and information regarding the IP sub-network directly or indirectly reachable through the edge switch, and
information processing means for generating a table putting relationships between the IP sub-network reachable and an ATM address of a device to be passed through for reaching the IP sub-network together by using information accumulated in the information accumulation means and transmitting the table to all the ATM network, the edge switch comprises
information notification means for notifying the route server of an ATM address of the device of its own and information regarding the IP sub-network directly or indirectly reachable through the device of its own,
address search means for searching network addresses of a destination of a packet for an ATM address of a device to be passed through with reference to a table sent from the route server, and
connection setting means for setting necessary connections including a switched virtual channel based on a search result obtained by the address search means.

In the preferred construction, various processing including acquisition of address information, notification of address information and setting of connections conducted by the route server and the edge switch are realized by an ATM-forum-based protocol.

In another preferred construction, the route server and the edge switch send and receive information as required any time after the device is started.

In another preferred construction, the route server exists only one on one the ATM network.

In another preferred construction, the route server and the edge switch send and receive information as required any time after the device is started, and the route server exists only one on one the ATM network.

According to the second aspect of the invention, in a network system including a route server and an ATM switch provided on an ATM network, and edge switches for connecting the ATM network and other IP sub-networks, a communication control method of controlling a connection between an arbitrary one of the edge switches and the ATM switch, comprising the steps of:

at the route server, collecting and accumulating, from every the edge switches on the ATM network, an ATM address of the edge switch and information regarding the IP sub-network directly or indirectly reachable through the edge switch, and generating a table putting relationships between the IP sub-network reachable and an ATM address of a device to be passed through for reaching the IP sub-network together by using accumulated information, and transmitting a generated table to all the ATM network, and at the edge switch notifying the route server of an ATM address of the device of its own and information regarding the IP sub-network directly or indirectly reachable through the device of its own, searching network addresses of a destination of a packet for an ATM address of a device to be passed through with reference to a table sent from the route server, and setting necessary connections including a switched virtual channel based on a search result.

In the preferred construction, various processing including acquisition of address information, notification of address information and setting of connections conducted by the route server and the edge switch are realized by an ATM-forum-based protocol.

In another preferred construction, the route server and the edge switch send and receive information as required any time after the device is started.

According to another aspect of the invention, in a network system including a route server and an ATM switch provided on an ATM network, and edge switches for connecting the ATM network and other IP sub-networks, a computer readable memory storing a control program for controlling a connection between an arbitrary one of the edge switches and the ATM switch, the control program comprising the steps of:

at the route server, collecting and accumulating, from every the edge switches on the ATM network, an ATM address of the edge switch and information regarding the IP sub-network directly or indirectly reachable through the edge switch, and generating a table putting relationships between the IP sub-network reachable and an ATM address of a device to be passed through for reaching the IP sub-network together by using accumulated information, and transmitting a generated table to all the ATM network, and at the edge switch notifying the route server of an ATM address of the device of its own and information regarding the IP sub-network directly or indirectly reachable through the device of its own, searching network addresses of a destination of a packet for an ATM address of a device to be passed through with reference to a table sent from the route server, and setting necessary connections including a switched virtual channel based on a search result.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
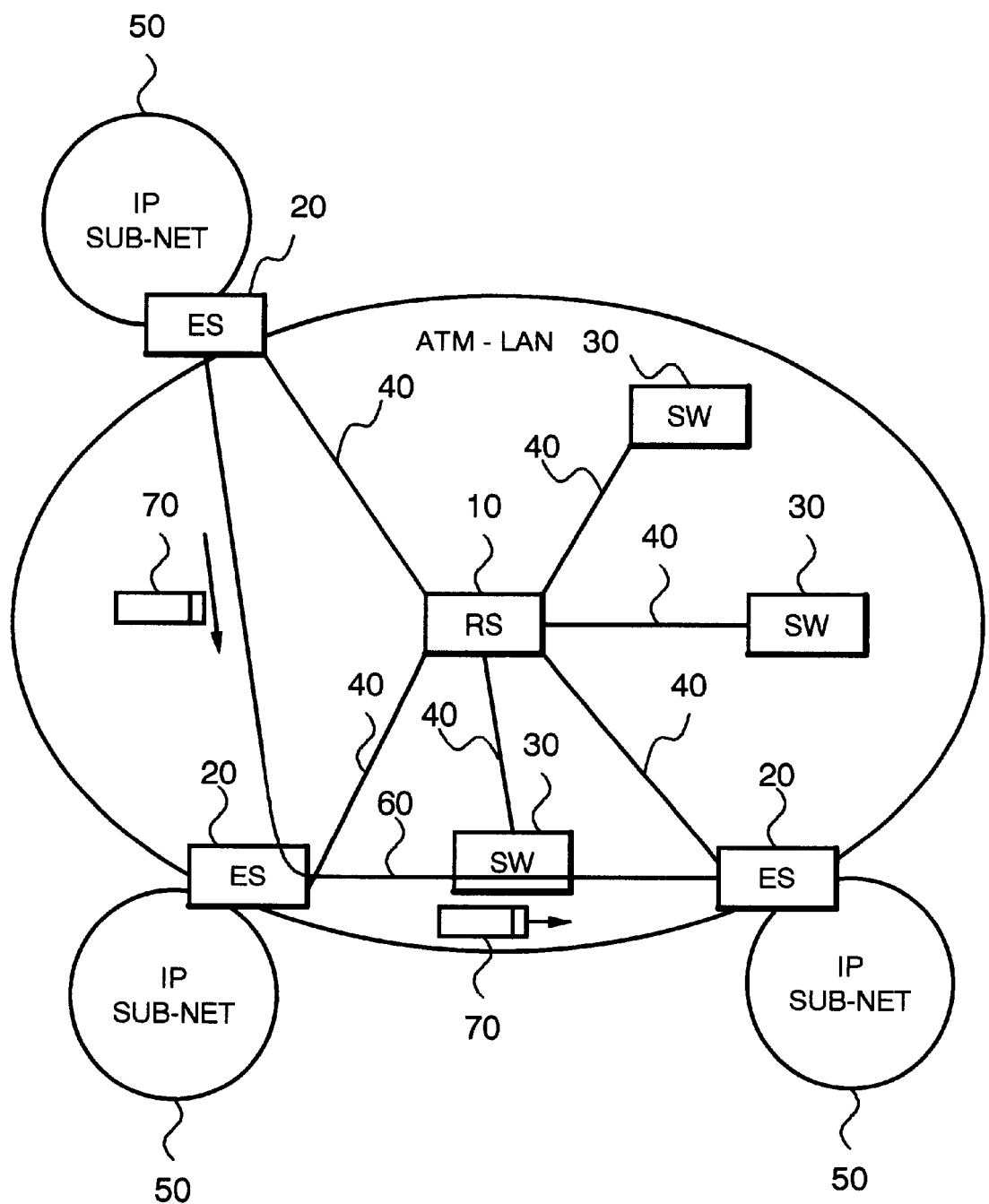
FIG. 1 is a schematic diagram showing structure of an ATM network using a communication control system according to one embodiment of the present invention.

FIG. 1 is a schematic diagram showing structure of an ATM network to which a communication control system according to one embodiment of the present invention is applied. As illustrated in FIG. 1, the ATM network used in the present embodiment includes a route server (RS) 10, an edge switch (ES) 20 connected by an SVC (switched virtual channel) to the route server 10, and an ATM switch (SW) 30 connected also by an SVC to the route server 10. According to the edge switch 20 connects the ATM-LAN with other IP sub-net. In the present embodiment, therefore, the route server 10 manages a network information data base of the entire network, as well as informing each edge switch 20, thereby enabling set-up of an SVC beyond the ATM-LAN between different IP sub-nets. In the present embodiment, used as a protocol of the network is preferably an ATM-forum-based protocol. In addition, the route server 10, the edge switch 20 and the ATM switch 30 establish and maintain a Unicast connection by means of a Unicast SVC connection 40 immediately after the activation of each device. This enables transmission and reception of network information between the route server 10 and each device at any time.

Figure 2:
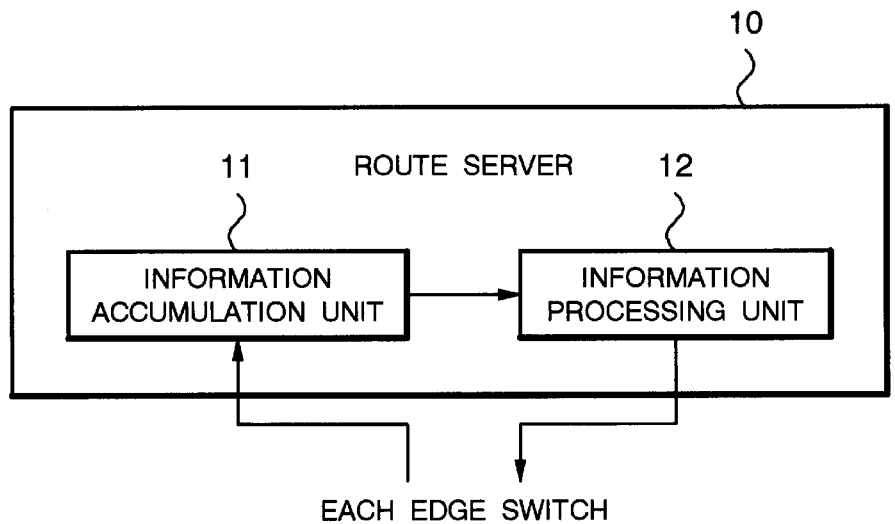
FIG. 2 is a block diagram showing structure of a route server in the present embodiment.

The route server 10 as a component of the above-described ATM network includes an information accumulation unit 11 and an information processing unit 12 as illustrated in FIG. 2. The information accumulation unit 11 collects and accumulates information from each edge switch 20 through the Unicast SVC connection 40. The information processing unit 12 generates an address resolution table putting together relationships between a reachable layer 3 sub-network 50 and an ATM address of a device to be passed through to reach the layer 3 sub-network 50 based on information accumulated at the information accumulation unit 11 and notifies every edge switch 20 of the table. The table enables the respective devices including the edge switch 20 to generate information for flowing the same packets on the same VC in the lump.

Figure 3:
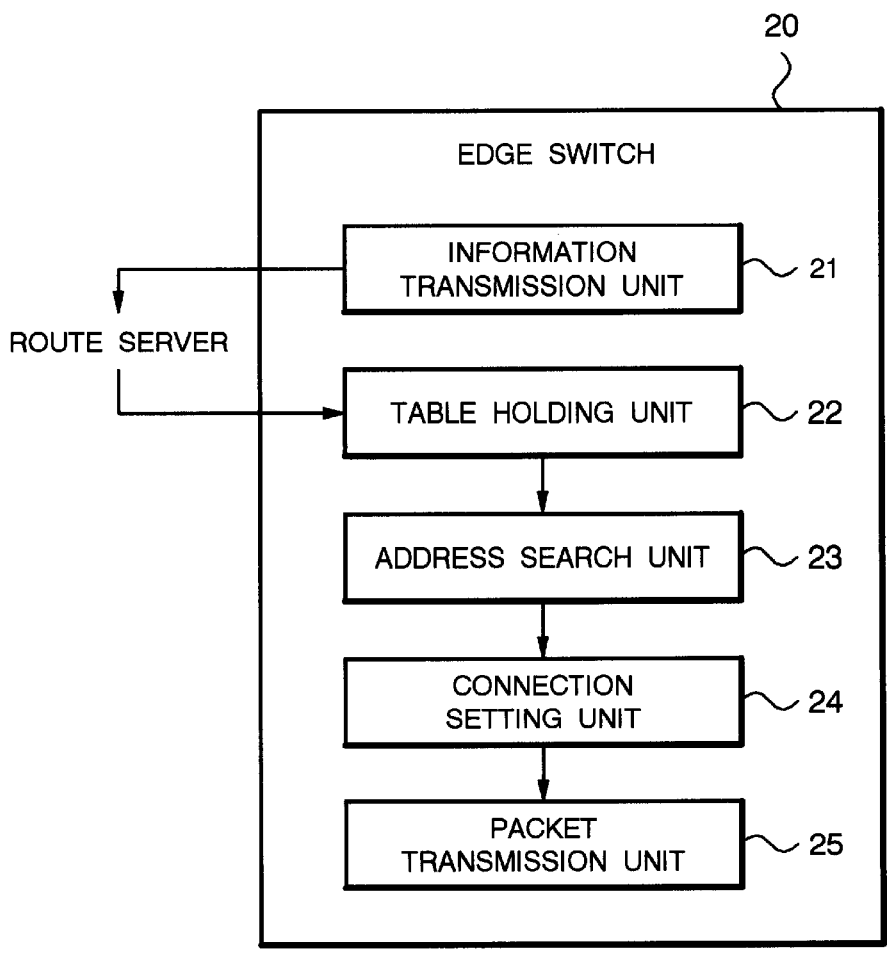
FIG. 3 is a block diagram showing structure of an edge switch in the present embodiment.

The edge switch 20, as illustrated in FIG. 3, includes an information transmission unit 21, a table holding unit 22, an address search unit 23, a connection setting unit 24 and a packet transmission unit 25. The information transmission unit 21 notifies the route server 10, through the Unicast SVC connection 40, of its own ATM address and information of a layer 3 sub-network directly or indirectly reachable through its own device. This enables the route server 10 to acquire address information of the entire network. The table holding unit 22 holds a table received from the route server 10. The address search unit 23 refers to a table held in the table holding unit 22 to search destination network addresses for an ATM address of a device to be passed through. The connection setting unit 24 sets an SVC and other connections for a device having an ATM address obtained by the search by the address search unit 23. This eliminates the need of mounting a routing protocol on every switch, thereby preventing wasteful consumption of a domain and further enabling a shortcut VC for sending a packet to a desired destination to be directly set up. The packet transmission unit 25 transmits a packet 70 to a device having an ATM address of a destination through a connection set by the connection setting unit 24. This enables high-speed transmission of a packet.

In addition, the route server 10, the edge switch 20 and the ATM switch 30 each have a function of realizing the above-described acquisition of address information, notification of address information, setting of connections and other processing by an ATM-forum-based protocol. This enables affinity with existing ATM network equipment to be increased.

Each of the above-described function execution units of the route server 10 and the edge switch 20 is implemented, for example, by program-controlled CPU and internal memory such as a RAM, and an external storage device such as a magnetic disk device. A computer program for controlling the CPU is stored, for provision, in a common storage medium such as a magnetic disk, an optical disk, or a semiconductor memory. In FIGS. 2 and 3, illustration is made only of a characteristic part of the structure of the present embodiment and that of the remaining common part is omitted.

Figure 4:
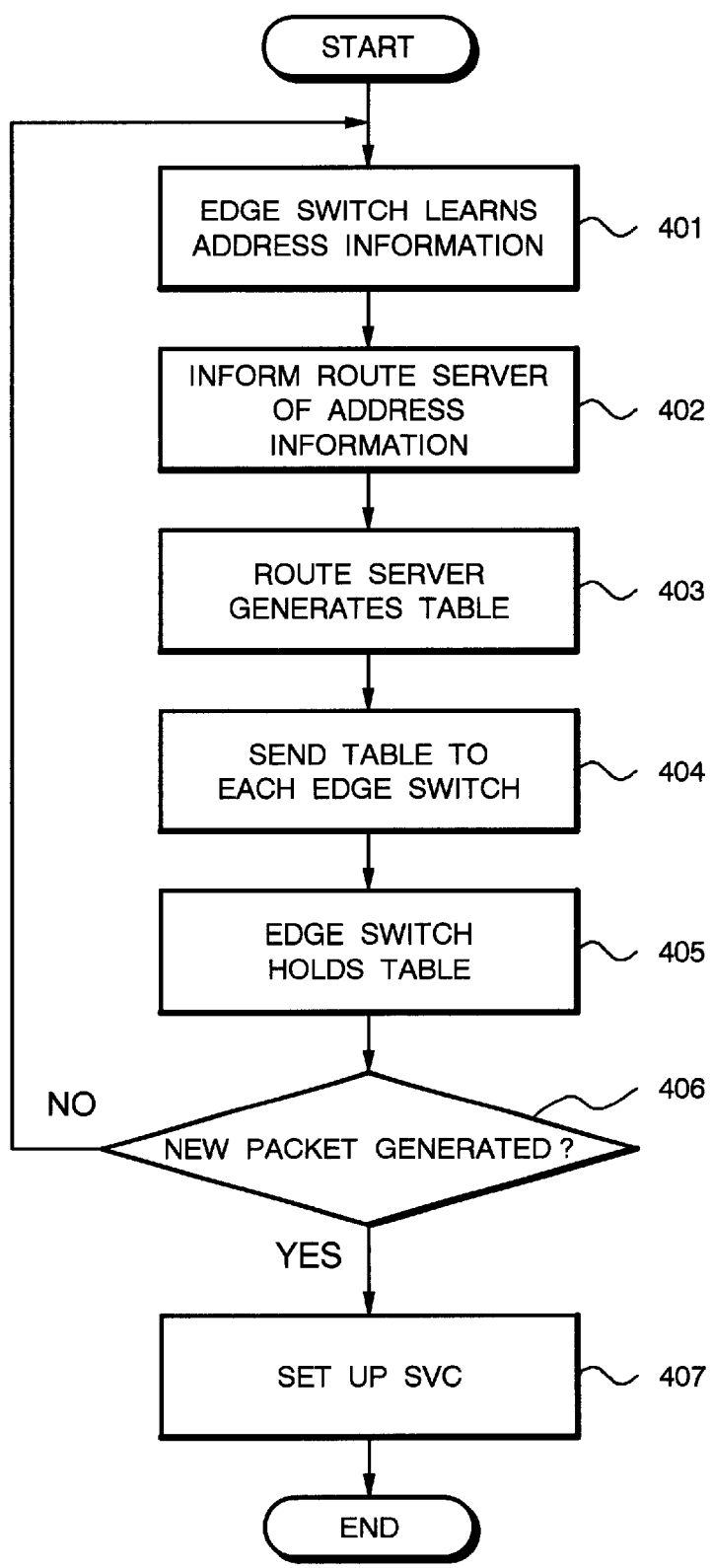
FIG. 4 is a flow chart showing operation of the present embodiment.
Figure 5:
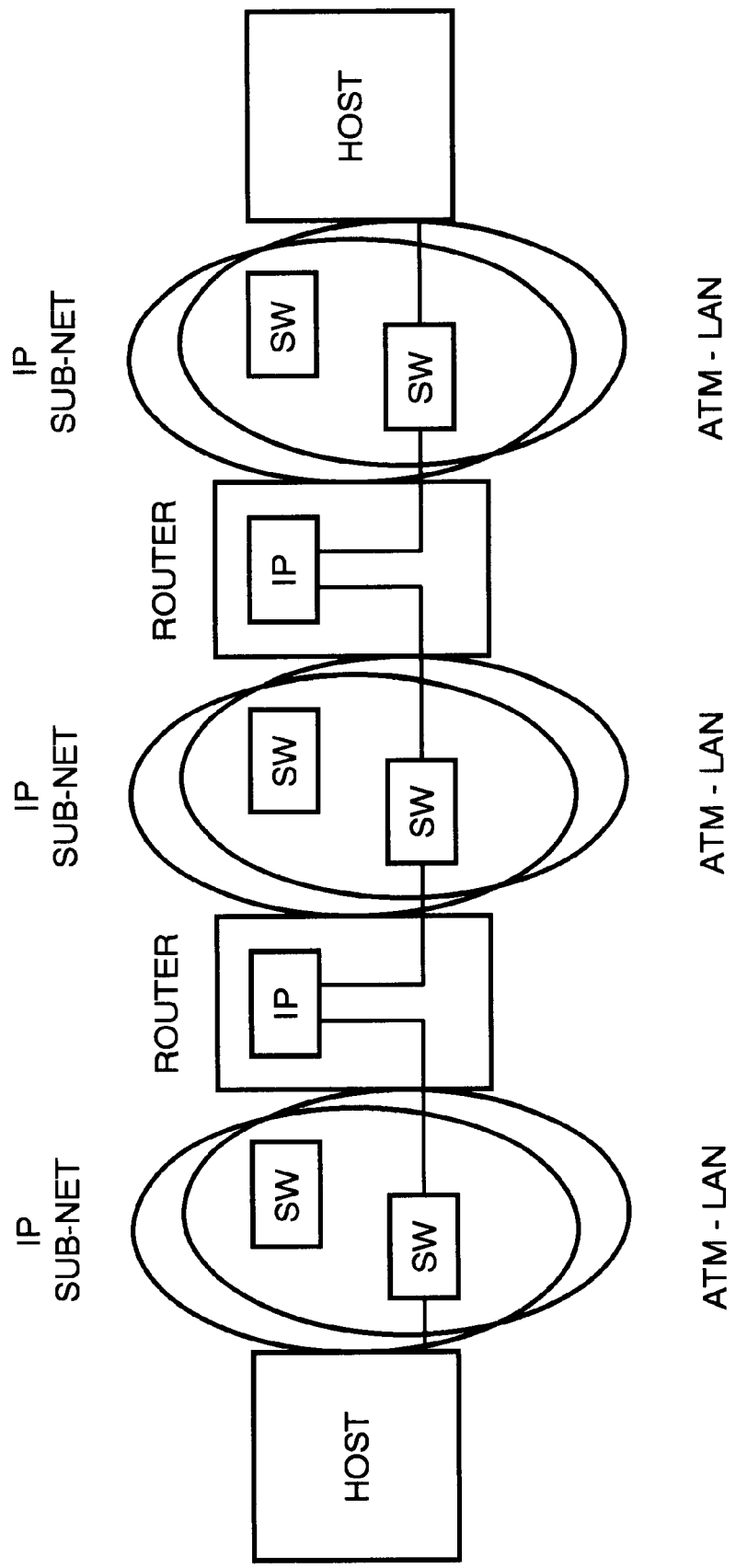
FIG. 5 is a schematic diagram showing structure of an ATM network using a classical IP model and a tag switching.
Figure 6:
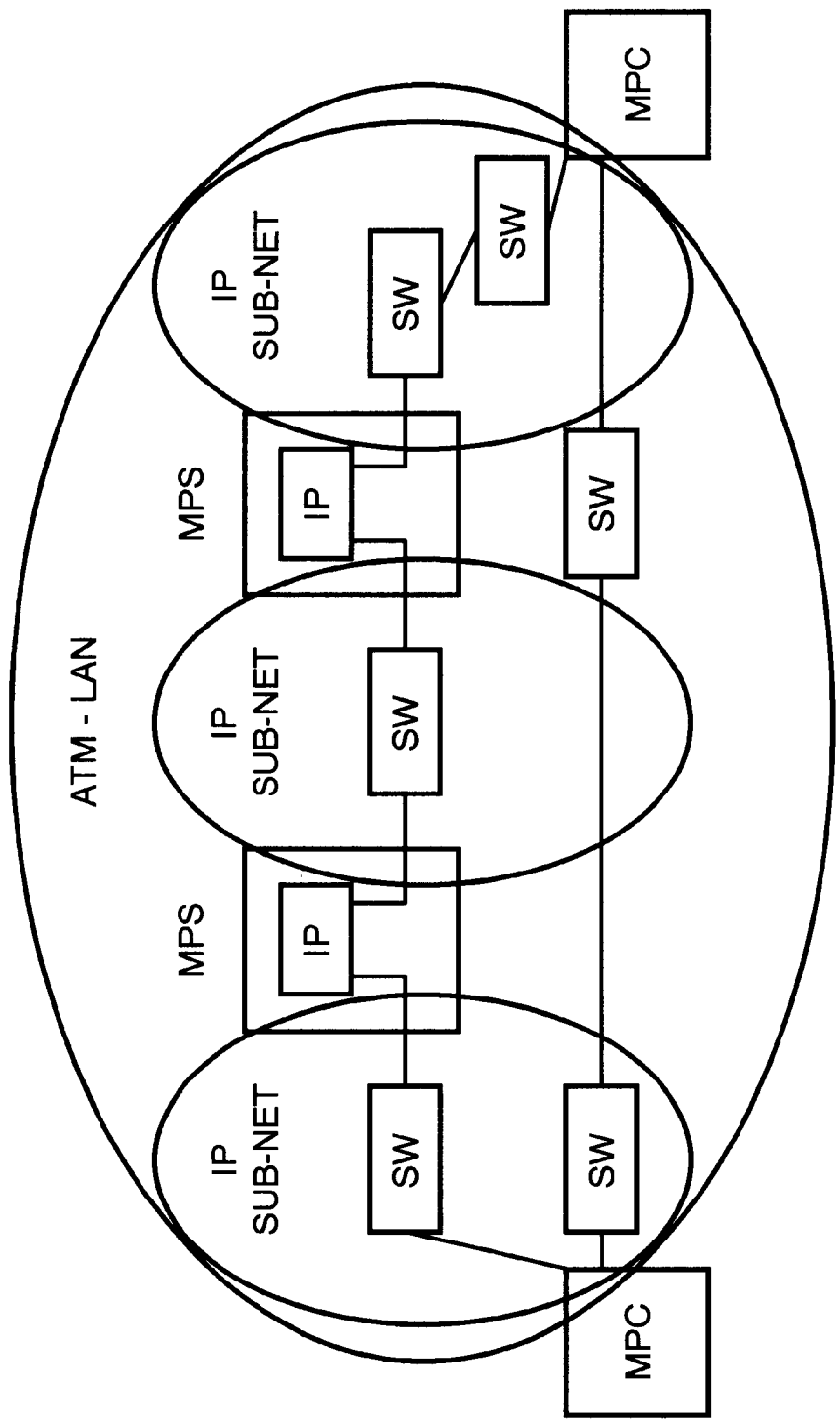
FIG. 6 is a schematic diagram showing structure of an ATM network using MPOA.
Figure 7:
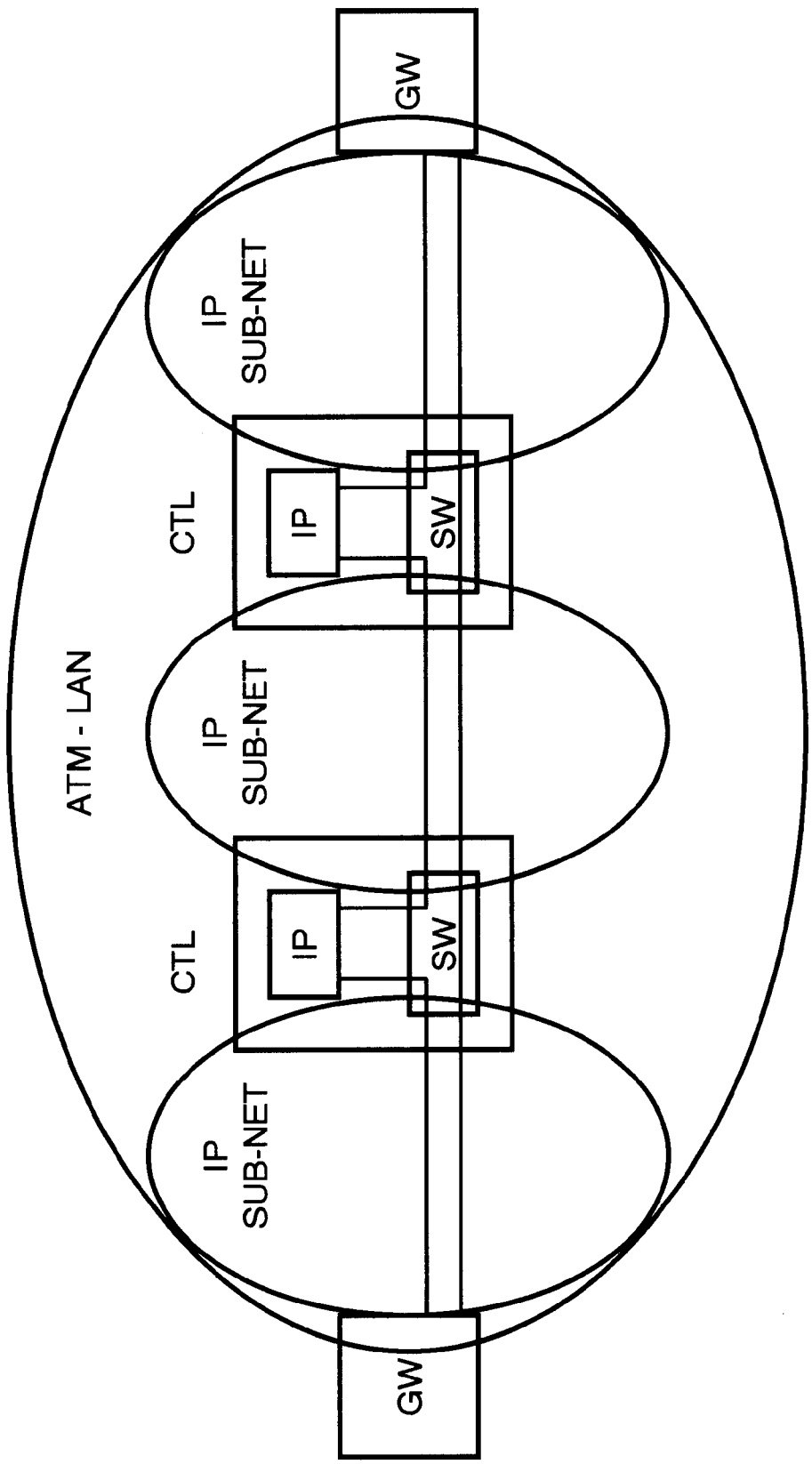
FIG. 7 is a schematic diagram showing structure of an ATM network using an IP switch.

Next, operation of the present embodiment will be described with reference to FIGS. 1 and 4. As an initial state, the route server 10 for managing a data base of network information is disposed within an ATM network. Although the route server 10 only needs to exist one in one ATM-LAN (see FIG. 1), it may exist in the plural. The route server 10 has a well-known ATM address which enables SVC connection to every edge switch 20 and every ATM switch 30 using an ATM-forum-based protocol in the ATM network.

The edge switch 20 learns address information of a layer 3 sub-network directly or indirectly reachable through its own device (Step 401) and informs the route server 10 of the obtained address information (Step 402). Notification to the route server 10 can be made as required any time after the edge switch 20 is started. For example, after a notification is made simultaneously with the start, it may be made periodically, or it may be made at arbitrary timing by an instruction from the route server 10 or an operator. This processing can be realized using an ATM-forum-based protocol. Address information here represents, for example, an external reachable address (IP address) or an ATM address.

Upon receiving notification from each edge switch 20 on the ATM network, the route server 10 puts addresses of devices reachable from each edge switch 20 and each ATM switch 30 together to create a table of correspondence between ATM addresses and external reachable addresses (Step 403). Then, to each edge switch 20, the route server 10 transmits an address information data base (table of correspondence) necessary for the edge switch 20 (Step 404). Transmission of the table of correspondence can be executed as required any time after the edge switch 20 is started. The edge switch 20 holds the received table (Step 405).

When a new packet is generated, the edge switch 20 instantly sets up an SVC beyond the ATM network based on the held table of correspondence (Steps 406 and 407). Even when the edge switch 20 fails to hold a table at the time when a new packet is generated, since the edge switch 20 is always allowed to communicate with the route server 10, the edge switch can receive the latest table held in the route server 10 and set up an SVC instantly based on the table. Newly generated packet flows on thus set up SVC, making high-speed data transfer possible.

Acquisition of address information, notification of address information, setting of connections and other processing are realized by using RIP (Routing Information Protocol), OSPF (Open Shortest Path First), an ATM signaling protocol or other protocol.

As described in the foregoing, the ATM network communication control system and the communication control method thereof of the present invention have an effect of enabling high-speed packet communication because direct packet transmission is possible even between different subnets without conducting hop-by-hop transmission. The reason is that each edge switch 20 is allowed to set up a VC directly to other edge switch 20 based on a table notified by the route server 10.

Another effect of the present invention is instantly setting up an end-to-end SVC without transmission or reception of information using a complicated protocol even when a new packet is generated. The reason is that each edge switch 20 learns a network layer reachable address of its own and informs the route server 10 of a network information data base and the route server 10 generates an address resolution network information data base based on the information.

In addition, the present invention achieves excellent affinity with an existing ATM network. The reason is that acquisition of address information, notification of address information, setting of connections and other processing conducted by the route server 10 and the edge switch 20 are realized by an ATM-forum-based protocol.

A further effect of the present invention is reduction of wasteful consumption of an IP domain. The reason is that provision of an IP sub-net within an ATM network is unnecessary.

Moreover, according to the present invention, it is unnecessary to mount a routing protocol on an ATM switch. The reason is that an ATM switch within an ATM network only conducts ATM-forum-based signaling and not routing.

Still further effect of the present invention is setting up an end-to-end SVC by reduced processing as compared with that conventionally required without operating a special protocol even when a new packet is generated. The reason is that a route server and an edge switch on an ATM network interchange its own network information with each other from the start of the device to enable preparation of a table for address resolution in advance.

Still further effect of the present invention is cutting address resolution resources of the entire network down to be less than those for conventional techniques when the network is increased in scale. The reasons are that the route server 10 is required one for one ATM-LAN in principle and that centralized processing of network information of the entire network by the route server 10 saves redundant data.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A communication control system including a route server and an ATM switch provided on an ATM network, and edge switches for connecting the ATM network and other IP sub-networks to control a connection between an arbitrary one of said edge switches and said ATM switch, wherein said route server comprising:
information accumulation means for collecting and accumulating, from every said edge switches on said ATM network, an ATM address of the edge switch and information regarding said IP sub-network directly or indirectly reachable through the edge switch; and
information processing means for generating a table putting relationships between said IP sub-network reachable and an ATM address of a device to be passed through for reaching the IP sub-network together by using information accumulated in said information accumulation means and transmitting the table to all said ATM network;

said edge switch comprising:
information notification means for notifying said route server of an ATM address of the device of its own and information regarding said IP sub-network directly or indirectly reachable through the device of its own;
address search means for searching network addresses of a destination of a packet for an ATM address of a device to be passed through with reference to a table sent from said route server; and
connection setting means for setting necessary connections including a switched virtual channel based on a search result obtained by said address search means.

2. The communication control system as set forth in claim 1, wherein
various processing including acquisition of address information, notification of address information and setting of connections conducted by said route server and said edge switch are realized by an ATM-forum-based protocol.

3. The communication control system as set forth in claim 1, wherein
said route server and said edge switch send and receive information as required any time after the device is started.

4. The communication control system as set forth in claim 1, wherein
said route server exists only one on one said ATM network.

5. The communication control system as set forth in claim 1, wherein
said route server and said edge switch send and receive information as required any time after the device is started, and
said route server exists only one on one said ATM network.

6. In a network system including a route server and an ATM switch provided on an ATM network, and edge switches for connecting the ATM network and other IP sub-networks, a communication control method of controlling a connection between an arbitrary one of said edge switches and said ATM switch, comprising the steps of:

at said route server,
collecting and accumulating, from every said edge switches on said ATM network, an ATM address of the edge switch and information regarding said IP sub-network directly or indirectly reachable through the edge switch, and
generating a table putting relationships between said IP sub-network reachable and an ATM address of a device to be passed through for reaching the IP sub-network together by using accumulated information, and
transmitting a generated table to all said ATM network, and at said edge switch
notifying said route server of an ATM address of the device of its own and information regarding said IP sub-network directly or indirectly reachable through the device of its own,
searching network addresses of a destination of a packet for an ATM address of a device to be passed through with reference to a table sent from said route server, and
setting necessary connections including a switched virtual channel based on a search result.

7. The communication control method as set forth in claim 6, wherein
various processing including acquisition of address information, notification of address information and setting of connections conducted by said route server and said edge switch are realized by an ATM-forum-based protocol.

8. The communication control method as set forth in claim 6, wherein
said route server and said edge switch send and receive information as required any time after the device is started.

9. In a network system including a route server and an ATM switch provided on an ATM network, and edge switches for connecting the ATM network and other IP sub-networks, a computer readable memory storing a control program for controlling a connection between an arbitrary one of said edge switches and said ATM switch, said control program comprising the steps of:

at said route server,
collecting and accumulating, from every said edge switches on said ATM network, an ATM address of the edge switch and information regarding said IP sub-network directly or indirectly reachable through the edge switch, and generating a table putting relationships between said IP sub-network reachable and an ATM address of a device to be passed through for reaching the IP sub-network together by using accumulated information, and transmitting a generated table to all said ATM network, and at said edge switch notifying said route server of an ATM address of the device of its own and information regarding said IP sub-network directly or indirectly reachable through the device of its own, searching network addresses of a destination of a packet for an ATM address of a device to be passed through with reference to a table sent from said route server, and setting necessary connections including a switched virtual channel based on a search result.

10. The computer readable memory as set forth in claim 9, wherein said control program realizes various processing including acquisition of address information, notification of address information and setting of connections conducted by said route server and said edge switch by an ATM-forum-based protocol.

11. The computer readable memory as set forth in claim 9, wherein in said control program, said route server and said edge switch send and receive information as required any time after the device is started.

* * * * *